US009161176B2

(12) United States Patent
Alberth, Jr. et al.

(10) Patent No.: US 9,161,176 B2
(45) Date of Patent: Oct. 13, 2015

(54) METHODS AND APPARATUS FOR SERVING CONTENT TO A WIRELESS DEVICE (75) Inventors: William P. Alberth, Jr., Prairie Grove, IL (US); Wayne W. Ballantyne, Coconut Creek, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 139 days.

(21) Appl. No.: 13/586,360

(22) Filed: Aug. 15, 2012

(65) Prior Publication Data
US 2014/0050137 A1 Feb. 20, 2014

(51) Int. Cl.
H04H 20/71 (2008.01)
H04W 4/06 (2009.01)
H04W 4/22 (2009.01)

(52) U.S. Cl.
CPC . *H04W 4/06* (2013.01); *H04W 4/22* (2013.01)

(58) Field of Classification Search
CPC .................................. H04W 4/22; H04W 4/02
See application file for complete search history.

(56) References Cited

U.S. PATENT DOCUMENTS

| | | | |
|---|---|---|---|
| 7,146,631 B1* | 12/2006 | Tanaka et al. ............... | 725/112 |
| 2003/0182393 A1 | 9/2003 | Tobin et al. | |
| 2004/0210526 A1 | 10/2004 | Brown | |
| 2008/0059998 A1* | 3/2008 | McClenny et al. ............. | 725/33 |
| 2009/0170467 A1 | 7/2009 | Nowlan et al. | |
| 2009/0286502 A1* | 11/2009 | Sennett et al. ............. | 455/404.1 |
| 2010/0029243 A1* | 2/2010 | Ozer et al. ................ | 455/404.1 |
| 2010/0124898 A1* | 5/2010 | Qu et al. ................... | 455/404.1 |
| 2010/0197265 A1* | 8/2010 | Dorenbosch et al. ....... | 455/404.1 |
| 2011/0159837 A1* | 6/2011 | Daly et al. ................. | 455/404.1 |
| 2012/0036529 A1* | 2/2012 | McClenny et al. ............. | 725/33 |
| 2012/0155358 A1* | 6/2012 | Hao et al. ................... | 370/312 |

FOREIGN PATENT DOCUMENTS

WO 2005089476 A2 9/2005
WO 2009087171 A1 7/2009

OTHER PUBLICATIONS

Patent Cooperation Treaty, International Search Report and Written Opinion of the International Searching Authority for International Application No. PCT/US2013/054053, Mar. 27, 2014, 9 pages.

* cited by examiner

*Primary Examiner* — Chi H Pham
*Assistant Examiner* — Fahmida Chowdhury
(74) *Attorney, Agent, or Firm* — Morris & Kamlay LLP (57) ABSTRACT

Methods and apparatus for serving content to a wireless device (106) are disclosed. In an embodiment, a gateway (114), or any other suitable device or system, determines that at least one message (e.g., a text or text-like message) containing a first pointer (e.g., a unicast URL) to the content (e.g., a web page) is to be transmitted via an emergency alert system (e.g., CMAS). In response thereto, the gateway (114) obtains the content using the first pointer and generates a second different pointer (e.g., a multicast/broadcast URL) to the content. The gateway (114) provides at least a portion of the at least one message and the second pointer for transmission via the emergency alert system (118). The gateway (114) also provides the content for transmission via a wireless multicast/broadcast channel (120) based on the second pointer.

49 Claims, 8 Drawing Sheets

METHODS AND APPARATUS FOR SERVING CONTENT TO A WIRELESS DEVICE

TECHNICAL FIELD

The present disclosure relates in general to wireless data transmission, and, in particular, to methods and apparatus for serving content to a wireless device.

BACKGROUND

Messages, such as text messages and email messages, often contain a pointer (e.g., data indicative of a location for other data) to additional content such as a uniform resource locator (URL). Typically, the additional content is only downloaded to the device if requested by the user. For example, a relatively small text message sent to a wireless device may contain a hyperlink, and when the user clicks the hyperlink, the wireless device may load a relatively large web page.

Wireless devices must share the available bandwidth with other wireless devices in the same geographic area. As a result, if a large number of wireless devices in the same geographic area all request additional content at approximately the same time, the network may become congested and slow down or fail. For example, if an emergency message is sent to a large number of wireless devices in a certain geographic region, and that message includes a hyperlink (e.g., to a web page with detailed evacuation instructions, maps, etc.), the network may be flooded with requests for the additional content.

DETAILED DESCRIPTION OF EXEMPLARY EMBODIMENTS

In general, the presently disclosed system monitors wireless messages before the messages are transmitted to find certain messages being transmitted to a large number (e.g., thousands) of wireless devices in the same geographic area that contain the same pointer (e.g., URL) to additional content (e.g., an evacuation map) during the same time window (e.g., hour). For these messages, a gateway, or any other suitable device or system, retrieves the additional content (e.g., the map) and transmits it on a multicast channel and/or a broadcast channel (hereinafter a multicast/broadcast channel) to conserve bandwidth in the event that many of the wireless devices attempt to retrieve the additional content at about the same time. In a typical example, wireless devices attempt to retrieve the additional content using the multicast/broadcast channel. However, wireless devices may be allowed to use the unicast channel as a backup.

Among other advantages, if a large number of wireless devices in the same geographic area all request the same additional content at approximately the same time, the network is less likely to become congested and slow down or fail, because the additional content is being transmitted on the multicast and/or broadcast channel instead of a plurality of unicast channels. For example, if an emergency message (e.g., CMAS) is sent to a large number of wireless devices in a certain geographic region, and that message includes a hyperlink or other pointer to additional content (e.g., an evacuation map), the additional content is transmitted on a multicast/broadcast channel (e.g., MBMS) instead of a plurality of unicast channels, thereby conserving bandwidth and data resources. Similarly, if a large number of wireless devices in a certain geographic region all receive different unicast messages, but with a common pointer to additional content (e.g., the same URL to a "viral" video), the additional content is transmitted on a multicast/broadcast channel instead of a plurality of unicast channels, thereby conserving bandwidth.

Briefly, methods and apparatus for serving content to a wireless device are disclosed. In an embodiment, a message discriminator receives a message (e.g., a text or text-like message) that is to be transmitted via an emergency alert system (e.g., CMAS) and determines if the message contains a first pointer (e.g., a unicast URL) to the content (e.g., a web page). A pointer generator operatively coupled to the message discriminator generates a second different pointer (e.g., a multicast/broadcast URL) to the content. A content obtainer operatively coupled to the message discriminator obtains the content using the first pointer. A message provider operatively coupled to the pointer generator provides at least a portion of the message and the second pointer for transmission via the emergency alert system channel. A content provider operatively coupled to the content obtainer provides the content for transmission via a wireless multicast or broadcast channel (e.g., MBMS) based on the second pointer. In one example, the same content is broadcast from multiple transmitters at the same time and then combined by each wireless device 106.

In one example, the message discriminator determines that a message includes an uniform resource locator (URL). In one example, the message provider provides the first pointer via the emergency alert system channel. In one example, the message provider provides data indicative of a time period during which use of the first pointer is to be suppressed. In one example, the content provider or network operator repeatedly provides the content for transmission via the wireless multicast/broadcast channel. In one example, the content provider or network operator terminates repeatedly providing the content for transmission via the wireless multicast/broadcast channel in response to a need for the content falling below a desired threshold. In one example, the content provider provides a plurality of different content for simultaneous transmission on a plurality of different wireless multicast/broadcast channels.

In one embodiment, methods and apparatus for retrieving content (e.g., a web page) at a wireless device are disclosed. A message receiver receives a message (e.g., a text or text-like message) at the wireless device. A pointer locator operatively coupled to the message receiver determines that the message includes a first pointer (e.g., unicast URL) and a second pointer (e.g., multicast/broadcast URL). A channel discriminator operatively coupled to the pointer locator determines if the content is available on a wireless multicast/broadcast channel using the second pointer. A multicast/broadcast content receiver operatively coupled to the channel discriminator obtains the content from the wireless multicast/broadcast channel using the second pointer, or a unicast content receiver operatively coupled to the channel discriminator obtains the content from the wireless unicast channel using the first pointer. A local memory operatively coupled to the multicast/broadcast content receiver and the unicast content receiver stores the content. A display operatively coupled to the local memory displays the content.

Figure 1:
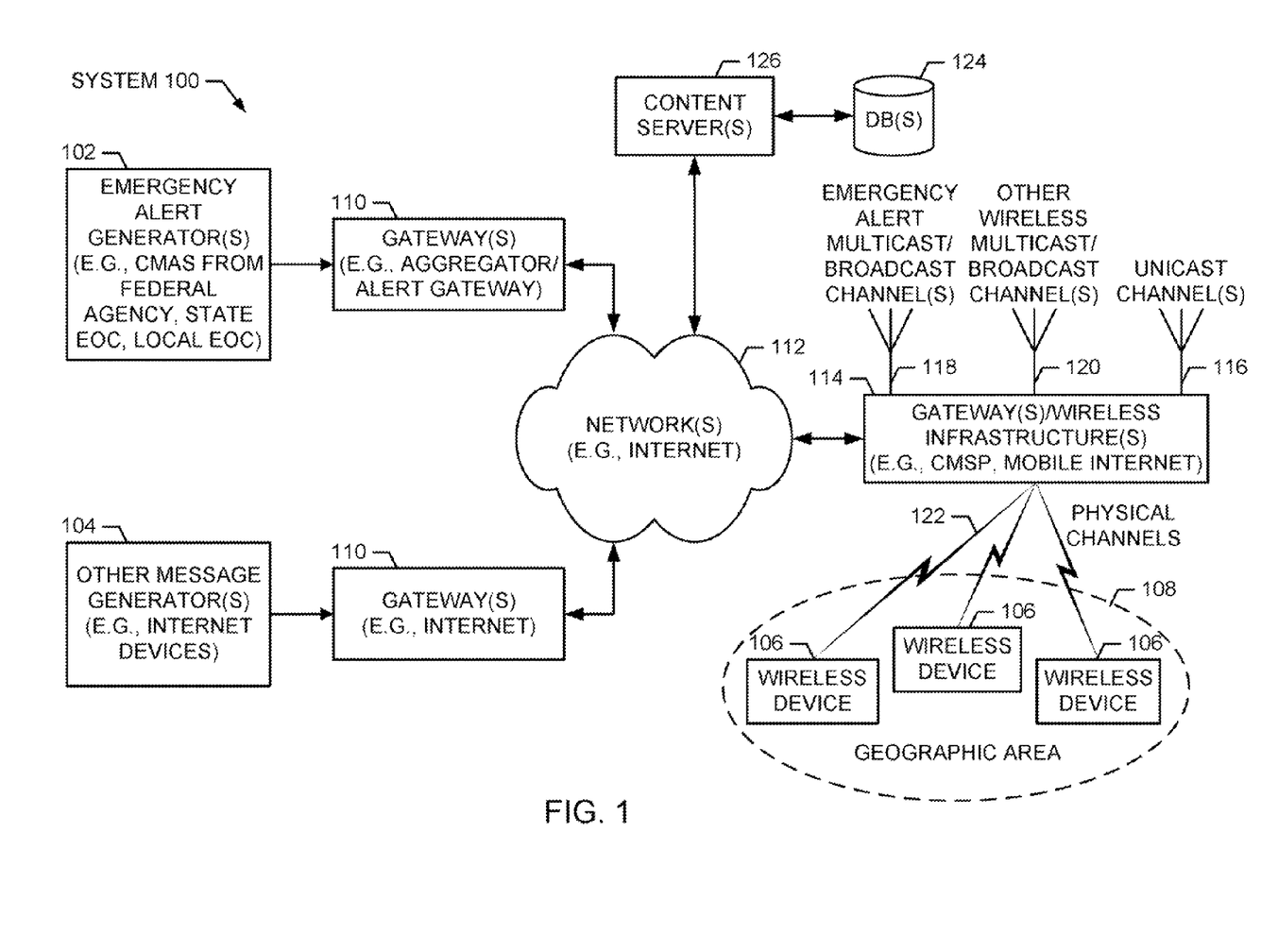
FIG. 1 is a block diagram of an example network communication system.

Turning now to the drawings, the present system is most readily realized in a network communications system, although any suitable communication system may be employed. A block diagram of an exemplary network communications system 100 is illustrated in FIG. 1. In general, the illustrated system 100 includes a plurality of message generators 102, 104, which send messages to a plurality of wireless devices 106 that are in a common geographic area 108 via a plurality of gateways, networks, and communication devices 110, 112, 114. Relatively short messages with an embedded pointer are sent to the plurality of devices 106 via a plurality of unicast channels 116 and/or via an emergency alert system multicast/broadcast channel 118, such as the commercial mobile alert system (CMAS). Additional content pointed to by the messages is sent via a separate multicast/broadcast channel 120. Each of these logical channels is passed over one or more physical channels 122. The additional content is retrieved from a database 124 connected to a content server 126. For example, the message may be "Evacuate your area using this map: www.fema.gov/map1", and the additional content may be a map pointed to by "www.fema.gov/map1".

More specifically, the message generator may be any suitable type of emergency alert generator, such as a CMAS generator 102, or any other suitable type of message generator 104, such as a Weather alert server, Twitter account, etc. Emergency alert generators 102, such as CMAS alert generators are also known as wireless emergency alert (WEA) generators and/or personal localized alerting network (PLAN) generators. CMAS is a public safety system used to send text-like messages about imminent threats and disasters, such as tornadoes or terrorist attacks, to wireless devices 106 in a common geographic area 108. CMAS enabled wireless devices 106 typically include a dedicated CMAS receiving function implemented in the modem software, that receives the message over cell broadcast resources available in GSM, CDMA, UMTS, LTE, etc. Accordingly, CMAS messages typically get through to the wireless devices 106 despite the fact that standard mobile voice and texting channels 116 may be congested (e.g., due to some local disaster). CMAS messages can target a certain geographic area 108 by only being sent from cell towers covering that area 108.

In either case (emergency alert generator 102 or other message generator 104), the generated messages typically go through one or more gateways 110. For emergency alert messages, the gateway 110 is typically an alert aggregator that receives, authenticates, validates and formats messages from authorized government agencies such as the Federal Emergency Management Agency (FEMA), the President of the United States, the National Weather Service (NWS), state emergency operations centers (EOCs), and local emergency operations centers (EOCs). For other messages, the gateway 110 may be any suitable gateway 110 such an internet gateway, and the sender may be any sender such as a person using a personal computer or a wireless device 106.

The gateways 110 deliver the messages to one or more networks 112 such as the Internet or any other suitable wired and/or wireless data network, including, but not limited to, any suitable wide area network or local area network. It will be appreciated that any of the devices described herein may be directly connected to each other instead of over a network. In the example illustrated in FIG. 1, the network 112 delivers the message to another gateway and associated wireless infrastructure 114. For CMAS messages, the wireless infrastructure 114 is typically owned and operated by a commercial mobile service provider (CMSP). For other messages, the wireless infrastructure 114 may be a commercial mobile service provider and/or any other suitable wireless infrastructure 114.

The gateway/wireless infrastructure 114 is capable of delivering data (e.g., messages and additional content associated with the messages) via unicast channels 116 and multicast or broadcast channels 118, 120. Unicast channels 116 are channels for sending data from a single sender to a single receiver (e.g., from the gateway 114 to a wireless device 116). For example, short message service (SMS) text messages are typically sent via a unicast channel. Multicast/broadcast channels 118, 120 are channels for sending data from a single sender to multiple receivers (e.g., from the gateway 114 to a plurality of wireless devices 116). Broadcast channels 118, 120 are channels for sending data from a single sender to an entire group of receivers within the region 108. CMAS messages typically use a special channel 118 dedicated to emergency purposes. Other wireless multicast/broadcast channels 120 are typically separate from the CMAS channel 118. For example, multimedia broadcast multicast service (MBMS) (e.g., for mobile TV) is sent via a multicast/broadcast channel 120.

As described in more detail below, when the system 100 is about to handle a large number of requests for the same content (e.g., during an emergency in a geographic area 108 and/or when a hyperlink becomes very popular), relatively short messages with an embedded pointer to additional content are sent via the unicast channel 116 and/or via the emergency alert channel 118. The additional content is then retrieved from the content server 126 and sent via the multicast/broadcast channel 120 to the wireless devices 106. Example wireless devices may include, but are not limited to, mobile phones, personal computers, kiosks, televisions, tablet devices etc.

Figure 2:
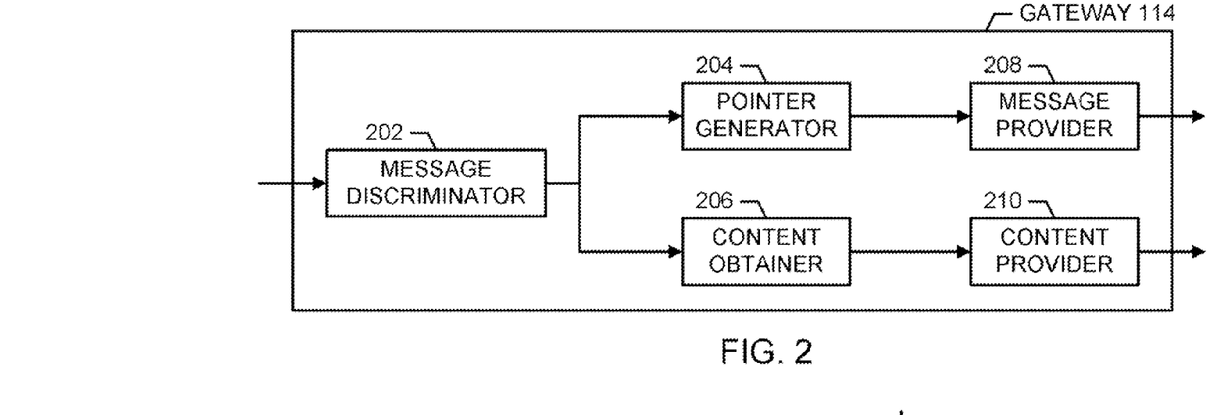
FIG. 2 is a block diagram of an example gateway.

A block diagram of certain elements of an example gateway 114 is illustrated in FIG. 2. Each of these blocks may be embodied in one or more local and/or distributed software programs, which are stored in one or more memories and executed by one or more processors. Although the gateway 114 is described with reference to the block diagram illustrated in FIG. 2, it will be appreciated that many other implementations may be used. For example, the order of many of the blocks may be changed, and some of the blocks described may be optional. One or more of the blocks may also be embodied in hardware or a combination of hardware and software. Suitable hardware may include one or more application specific integrated circuits (ASICs), state machines, field programmable gate arrays (FPGAs), and/or other hardware.

In this example, a message discriminator 202 receives a message that is to be transmitted via an emergency alert system and determines if the message contains a first pointer to content. For example, the message discriminator 202 may receive a CMAS message from a CMAS alert generator 102 via an aggregator/alert gateway 110, and that CMAS message may contain a URL pointing to additional content in the form of a webpage.

The message discriminator 202 may also receive a plurality of messages and determine that at least one message in the plurality of messages contains a first pointer to the content and that the at least one message is to be transmitted via a unicast channel to more than a threshold plurality of wireless devices associated with a desired geographic region. For example, the message discriminator 202 may determine that a plurality of unicast messages (e.g., text messages) all include the first pointer (e.g., URL) and are being transmitted to the same destination (e.g., wireless base station) at about the same time (e.g., same minute, hour, or day).

The message discriminator 202 passes at least the first pointer on to a pointer generator 204 and a content obtainer 206. The pointer generator 204 generates a second different pointer to the content. For example, the pointer generator 204 may add characters to a first URL to create a second URL. The content obtainer 206 obtains the content using the first pointer. For example, the content obtainer 206 may fetch a web page pointed to by a URL. As an example of how the order of some blocks may be changed, the pointer generator 204 may operate before, after, and/or in parallel with the content obtainer 206.

The pointer generator 204 passes at least a portion of the message and the second pointer on to a message provider 208. The message provider 208 provides at least a portion of the message and the second pointer for transmission via the emergency alert system channel. For example, the message provider 208 may provide the message and the second pointer to a commercial mobile service provider (CMSP). The message provider 208 may also provide at least a portion of the at least one message and the second pointer for transmission via a unicast channel. For example, the message provider 208 may send the message and the second pointer to a base station for point-to-point transmission.

The content obtainer 206 passes the content on to a content provider 210. The content provider 210 provides the content for transmission via a wireless multicast/broadcast channel based on the second pointer. For example, the content provider 210 may send the content to a base station for transmission using a multimedia broadcast multicast service (MBMS) to a plurality of wireless devices 106. As an example of how the order of some blocks may be changed, the message provider 208 may operate before, after, and/or in parallel with the content provider 210.

Figure 3:
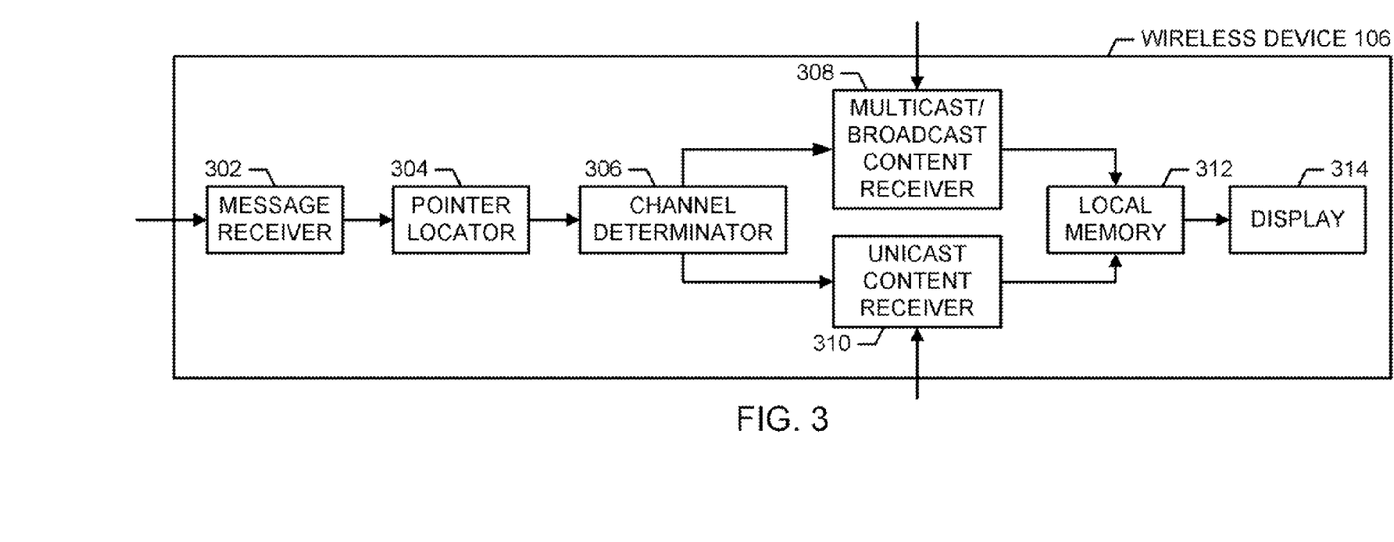
FIG. 3 is a block diagram of an example wireless device.

A block diagram of certain elements of an example wireless device 106 is illustrated in FIG. 3. Each of these blocks may be embodied in one or more local and/or distributed software programs, which are stored in one or more memories and executed by one or more processors. Although the wireless device 106 is described with reference to the block diagram illustrated in FIG. 3, it will be appreciated that many other implementations may be used. For example, the order of many of the blocks may be changed, and some of the blocks described may be optional. One or more of the blocks may also be embodied in hardware or a combination of hardware and software. Suitable hardware may include one or more application specific integrated circuits (ASICs), state machines, field programmable gate arrays (FPGAs), and/or other hardware.

In this example, a message receiver 302 receives a message from a wireless transmitter. For example, the message may be an emergency alert message or a unicast message. The message receiver 302 passes the message on to a pointer locator 304. The pointer locator 304 determines that the message includes a first pointer and a second pointer. For example, the first pointer may be a unicast URL and the second pointer may be a multicast/broadcast URL. The pointer locator 304 passes the first pointer and the second pointer to a channel discriminator 306. The channel discriminator 306 determines if the content is available on a wireless multicast/broadcast channel by using the second pointer. For example, the channel discriminator 306 may attempt to retrieve the content from a multimedia broadcast multicast service (MBMS).

If the content is available on the multicast/broadcast channel, a multicast/broadcast content receiver 308 retrieves the content from the wireless multicast/broadcast channel by using the second pointer. For example, multicast/broadcast content receiver 308 may obtain the content from a multimedia broadcast multicast service (MBMS). If the content is not available on the multicast/broadcast channel, a unicast content receiver 310 may obtain the content from a wireless unicast channel by using the first pointer. For example, the unicast content receiver 310 may obtain the content using a wireless point-to-point connection. As an example of how the order of some blocks may be changed, the multicast/broadcast content receiver 308 may operate before, after, and/or in parallel with the unicast content receiver 310.

If the multicast/broadcast content receiver 308 obtains the content, the multicast/broadcast content receiver 308 passes the content to a local memory 312 for storage. Similarly, if the unicast content receiver 310 obtains the content, the unicast content receiver 310 passes the content to the local memory 312 for storage. Once the content is stored in the local memory 312 (as part of a prefetch operation and/or in response to a user requesting the content), a display 314 may show the content to a user. For example, a user may request the content by clicking on a hyperlink.

Figure 4:
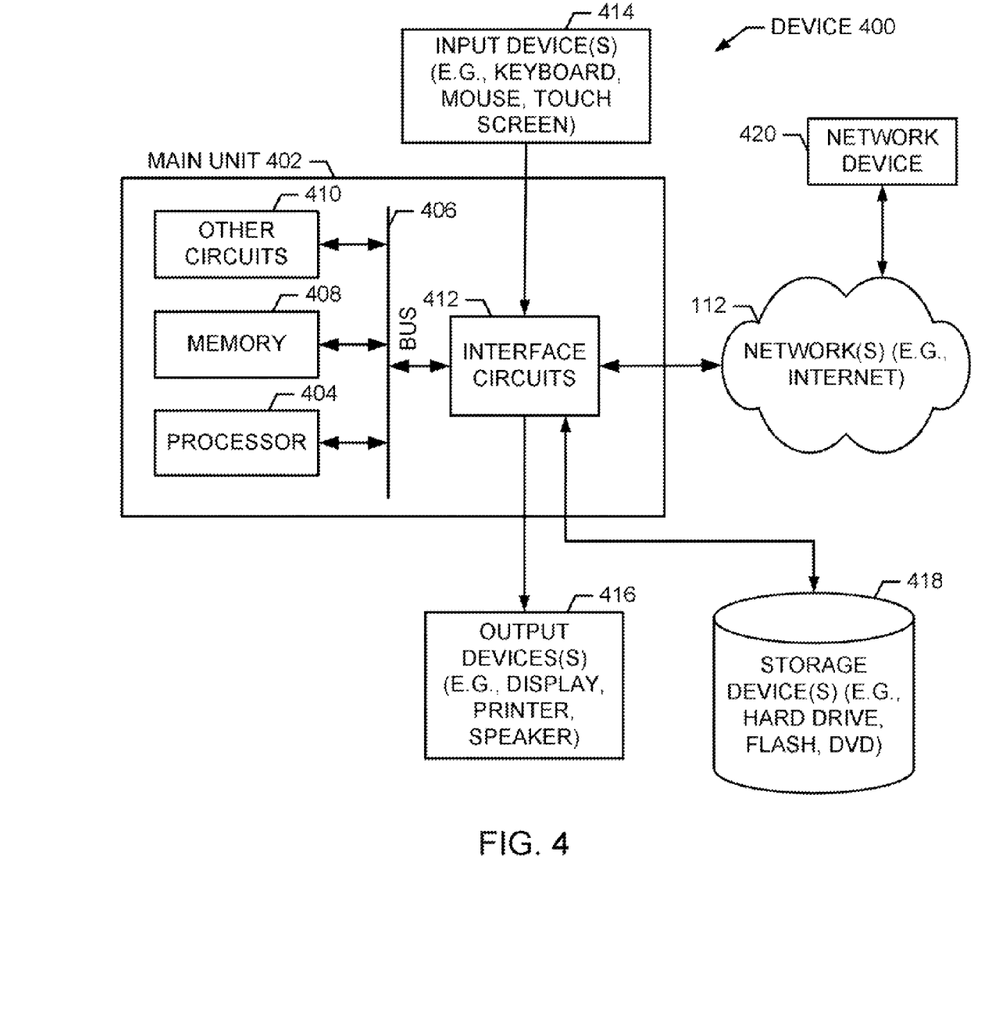
FIG. 4 is a block diagram of an example computing device.

Each of the devices illustrated in FIG. 1 may include certain common aspects of many devices such as microprocessors, memories, peripherals, etc. A detailed block diagram of the electrical systems of an example device is illustrated in FIG. 4.

The example device 400 includes a main unit 402 which may include one or more processors 404 electrically coupled by an address/data bus 406 to one or more memories 408, other computer circuitry 410, and one or more interface circuits 412. The processor 404 may be any suitable processor or plurality of processors. The memory 408 may include various types of non-transitory memory including volatile memory and/or non-volatile memory such as, but not limited to, distributed memory, read-only memory (ROM), FLASH memory, random access memory (RAM) etc. The memory 408 typically stores a software program that interacts with the other devices in the system 100 as described herein. This program may be executed by the processor 404 in any suitable manner. The memory 408 may also store digital data indicative of documents, files, programs, web pages, etc. retrieved from a server 126 and/or loaded via an input device 414.

The interface circuit 412 may be implemented using any suitable interface standard, such as an Ethernet interface and/or a Universal Serial Bus (USB) interface. One or more input devices 414 may be connected to the interface circuit 412 for entering data and commands into the main unit 402. For example, the input device 414 may be a keyboard, mouse, touch screen, track pad, isopoint, and/or a voice recognition system.

One or more displays, printers, speakers, and/or other output devices 416 may also be connected to the main unit 402 via the interface circuit 412. The display 416 may be a cathode ray tube (CRTs), liquid crystal displays (LCDs), or any other type of display. The display 416 generates visual displays of data generated during operation of the device 400. For example, the display 416 may be used to display web pages and/or other content received from the server 126. The visual displays may include prompts for human input, run time statistics, calculated values, data, etc.

One or more storage devices 418 may also be connected to the main unit 402 via the interface circuit 412. For example, a hard drive, CD drive, DVD drive, and/or other storage devices may be connected to the main unit 402. The storage devices 418 may store any type of data used by the device 400.

The device 400 may also exchange data with other network devices 420 via a connection to the network 112. The network connection may be any type of network connection, such as an Ethernet connection, digital subscriber line (DSL), telephone line, coaxial cable, etc. Users of the system 100 may be required to register with the server 126. In such an instance, each user may choose a user identifier (e.g., e-mail address) and a password which may be required for the activation of services. The user identifier and password may be passed across the network 112 using encryption built into the user's browser. Alternatively, the user identifier and/or password may be assigned by the server 126.

Figure 5:
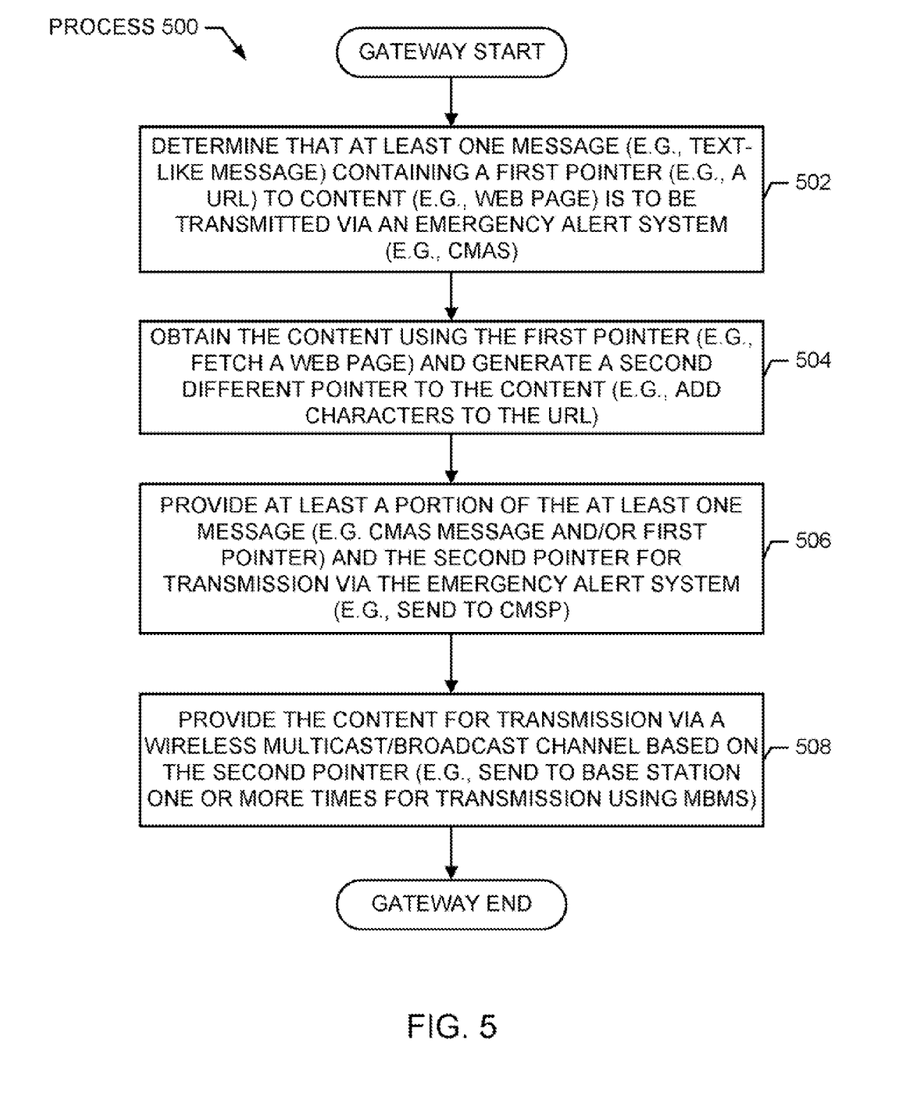
FIG. 5 is a flowchart of an example process for serving content from a gateway to a wireless device.

A flowchart of an example process 500 for serving content from a gateway 114, or any other suitable device or system, to a wireless device 106 is illustrated in FIG. 5. The process 500 may be embodied in one or more local and/or distributed software programs, which are stored in one or more memories and executed by one or more processors. Although the process 500 is described with reference to the flowchart illustrated in FIG. 5, it will be appreciated that many other methods of performing the acts associated with process 500 may be used. For example, the order of many of the steps may be changed, and some of the steps described may be optional. The process 500 may also be embodied in hardware or a combination of hardware and software. Suitable hardware may include one or more application specific integrated circuits (ASICs), state machines, field programmable gate arrays (FPGAs), and/or other hardware.

In general, a gateway 114, and/or any other suitable device or system, determines that a message containing a first pointer to content is to be transmitted via an emergency alert system. The gateway 114 then obtains the content using the first pointer and generates a second different pointer to the content. The gateway 114 then provides the message and the second pointer for transmission via the emergency alert system channel. The gateway 114 also provides the content for transmission via a wireless multicast/broadcast channel based on the second pointer.

More specifically, the example process 500 begins when a gateway 114, and/or any other suitable device or system, determines that at least one message containing a first pointer to content is to be transmitted via an emergency alert system (block 502). For example, the gateway 114 may receive a CMAS message from a CMAS alert generator 102 via an aggregator/alert gateway 110, and that CMAS message may contain a URL pointing to additional content in the form of a webpage.

The gateway 114 then obtains the content using the first pointer and generates a second different pointer to the content (block 504). For example, the gateway 114 may fetch a web page pointed to by a unicast URL embedded in the message, and add characters to the unicast URL to create a multicast/broadcast URL. The second pointer may include none, some, or the entire first pointer. For example, the gateway 114 may add one or more characters to the URL embedded in the message(s) (e.g., www.domain.com/content.htm becomes www.multicast.com/www.domain.com/content.htm), or the gateway 114 may create an entirely new pointer (e.g., www.domain.com/content.htm becomes www.multicast.com/123456). In another example, the gateway 114 may add one or more control characters or tags to the URL embedded in the message(s).

The gateway 114 then provides at least a portion of the message and the second pointer for transmission via the emergency alert system channel (block 506). For example, the gateway 114 may provide the message "Evacuate your area using this map" and the second pointer "www.multicast.com/www.fema.gov/map1" to a commercial mobile service provider (CMSP) for broadcast transmission to a plurality of wireless devices 106.

The gateway 114 also provides the content for transmission via a wireless multicast/broadcast channel based on the second pointer (block 508). For example, the gateway 114 may send the content (e.g., an evacuation map or a viral video) to a base station for transmission using a multimedia broadcast multicast service (MBMS) to a plurality of wireless devices 106 in a way that the additional content may be retrieved by one or more wireless devices 106 using a multicast/broadcast pointer. As an example of how the order of some steps may be changed, the gateway 114 may provide the message and/or the second pointer for transmission (block 506) before, after, and/or in parallel with providing the content for transmission (block 508).

Figure 6:
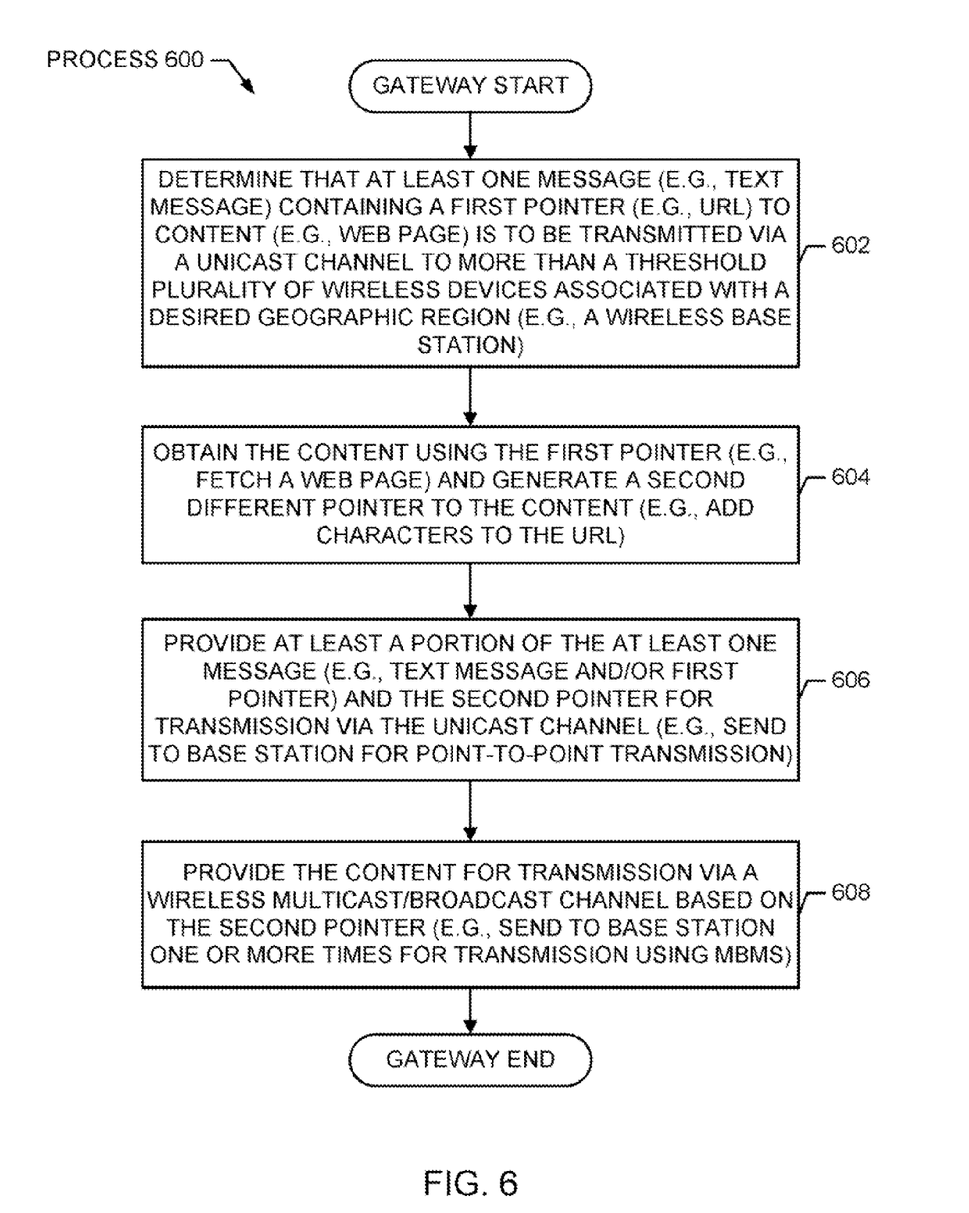
FIG. 6 is a flowchart of another example process for serving content from a gateway to a wireless device.

A flowchart of another example process 600 for serving content from a gateway 114, or any other suitable device or system, to a wireless device 106 is illustrated in FIG. 6. The process 600 may be embodied in one or more local and/or distributed software programs, which are stored in one or more memories and executed by one or more processors. Although the process 600 is described with reference to the flowchart illustrated in FIG. 6, it will be appreciated that many other methods of performing the acts associated with process 600 may be used. For example, the order of many of the steps may be changed, and some of the steps described may be optional. The process 600 may also be embodied in hardware or a combination of hardware and software. Suitable hardware may include one or more application specific integrated circuits (ASICs), state machines, field programmable gate arrays (FPGAs), and/or other hardware.

In general, a gateway 114, and/or any other suitable device or system, determines that a plurality of messages containing a first pointer to content are to be transmitted via a unicast channel to more than a threshold plurality of wireless devices associated with a desired geographic region. The gateway 114 then obtains the content using the first pointer and generates a second different pointer to the content. The gateway 114 then provides the message and the second pointer for transmission via a plurality of unicast channels. The gateway 114 also provides the content for transmission via a wireless multicast/broadcast channel based on the second pointer.

More specifically, the example process 600 begins when a gateway 114, and/or any other suitable device, determines that at least one message in a plurality of messages contains a first pointer to the content and that the at least one message is to be transmitted via a unicast channel to more than a threshold plurality of wireless devices associated with a desired geographic region (block 602). For example, the gateway 114 may be processing a plurality of unicast messages that include the same URL and are being sent to the same destination (e.g., a wireless base station or a group of wireless base stations) within a desired time window (e.g., same minute, hour, or day).

Each of these messages may be similar, or the messages may be different. For example, if a plurality of people in the same geographic area 108 all subscribe to the same news feed, the messages may be very similar or identical (e.g., other than the recipient's name, etc.). In another example, a particular URL may be associated with "viral" content, and a large number of people in the same geographic area 108 may be receiving different text messages with a common link to the content.

The threshold may be static or dynamic. In other words, the threshold may be set to a constant value, or the threshold may vary according to any suitable formula. For example, if only X multicast/broadcast channels 120 are available, the gateway 114 may set the threshold to only capture the top X messages based on popularity.

The gateway 114 then obtains the content using the first pointer and generates a second different pointer to the content (block 604). For example, the gateway 114 may fetch a web page pointed to by a unicast URL embedded in the message, and add characters to the unicast URL to create a multicast/broadcast URL. The second pointer may include none, some, or the entire first pointer. For example, the gateway 114 may add one or more characters to the URL embedded in the message(s) (e.g., www.domain.com/content.htm becomes www.multicast.com/www.domain.com/content.htm), or the gateway 114 may create an entirely new pointer (e.g., www-.domain.com/content.htm becomes www.multicast.com/123456). In another example, the gateway 114 may add one or more control characters or tags to the URL embedded in the message(s).

The gateway 114 then provides at least a portion of the at least one message and the second pointer for transmission via a unicast channel (block 606). For example, the gateway 114 may send the message "Here is the newspaper you subscribe to" and the second pointer "www.multicast.com/www.newspaper.com/today" to a base station for point-to-point transmission to a plurality of wireless devices 106.

The gateway 114 also provides the content for transmission via a wireless multicast channel based on the second pointer (block 608). For example, the gateway 114 may send the content (e.g., an evacuation map or a viral video) to a base station for transmission using a multimedia broadcast multicast service (MBMS) to a plurality of wireless devices 106 in a way that the additional content may be retrieved by one or more wireless devices 106 using a multicast/broadcast pointer. As an example of how the order of some steps may be changed, the gateway 114 may provide the message and/or the second pointer for transmission (block 606) before, after, and/or in parallel with providing the content for transmission (block 608).

Figure 7:
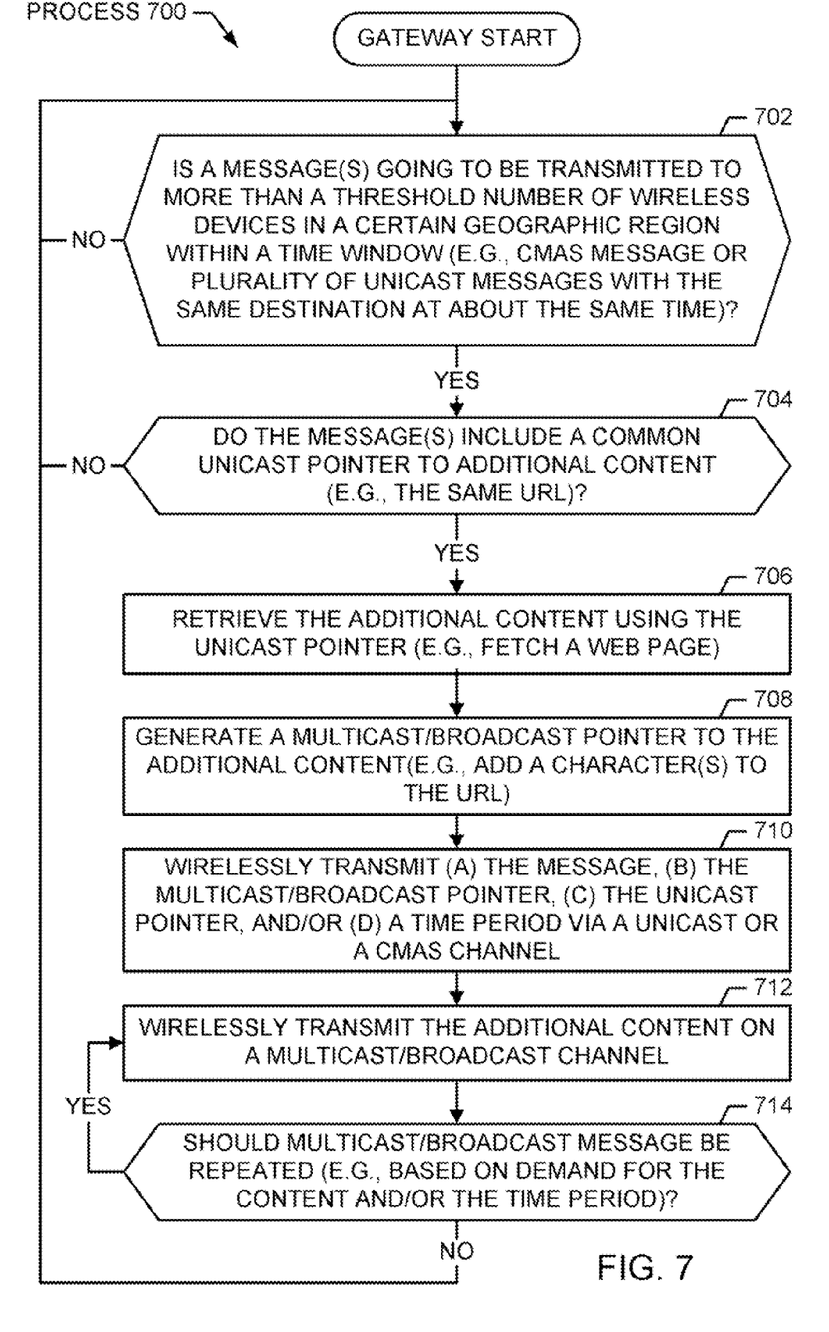
FIG. 7 is a flowchart of yet another example process for serving content from a gateway to a wireless device.

A flowchart of another example process 700 for serving content from a gateway 114, or any other suitable device or system, to a wireless device 106 is illustrated in FIG. 7. The process 700 may be embodied in one or more local and/or distributed software programs, which are stored in one or more memories and executed by one or more processors. Although the process 700 is described with reference to the flowchart illustrated in FIG. 7, it will be appreciated that many other methods of performing the acts associated with process 700 may be used. For example, the order of many of the steps may be changed, and some of the steps described may be optional. The process 700 may also be embodied in hardware or a combination of hardware and software. Suitable hardware may include one or more application specific integrated circuits (ASICs), state machines, field programmable gate arrays (FPGAs), and/or other hardware.

In general, a gateway 114 and/or other device(s) find wireless messages that are being transmitted to a large number of wireless devices 106 in the same geographic area 108 (e.g., same cell) that contain the same pointer (e.g., URL) to additional content (e.g., web page) during the same time window (e.g., 30 minutes). For these messages, the gateway 114 retrieves the additional content and transmits it on a multicast/broadcast channel to conserve bandwidth in the event that many of the wireless devices 106 attempt to retrieve the additional content at about the same time.

More specifically, the example process 700 begins when the gateway 114 determines if one or more messages are going to be transmitted to more than a threshold number of wireless devices 106 in a certain geographic region 108 within a time window (block 702). For example, a CMAS message is a message that is broadcast to all CMAS enabled devices covered by one or more cellular towers that are directed to send that CMAS message. In this example, the gateway 114 may not be able to determine the exact number of such devices or if that number is above a certain threshold. However, the process 700 may be structured to treat all CMAS messages as exceeding the threshold. In other words, the threshold for CMAS messages may be zero.

In another example, the gateway 114 may be processing a plurality of unicast messages sent within a time window (e.g., same minute, hour, or day) to the same destination. Each of these messages may be similar, or the messages may be different. For example, if a plurality of people in the same geographic area 108 all subscribe to the same news feed, the messages may be very similar or identical (e.g., other than the recipient's name, etc.). In another example, a particular URL may be associated with "viral" content, and a large number of people in the same geographic area 108 may be receiving different text messages with a common link to the content.

The threshold may be static or dynamic. In other words, the threshold may be set to a constant value, or the threshold may vary according to any suitable formula. For example, if only X multicast/broadcast channels 120 are available, the gateway 114 may set the threshold to only capture the top X messages based on popularity.

If the gateway 114 does not determine that one or more messages are going to be transmitted to more than some threshold number of wireless devices 106 within the time window, the gateway 114 continues to look for that circumstance to occur at block 702. If the gateway 114 does determine that one or more messages are going to be transmitted to more than the threshold number of wireless devices 106 within the time window, the gateway 114 also determines if the message(s) include a common unicast pointer to additional content (block 704). For example, the gateway 114 may determine that a single CMAS message contains any URL, or the gateway 114 may determine that a plurality of CMAS messages (or a subset thereof) that are headed for the same geographic area 108 all contain the same URL by counting the number of occurrences of each URL routed through that gateway 114 (e.g., in unicast packets).

If the gateway 114 does not see a common unicast pointer in the message(s) destined for the same geographic region 108, the gateway 114 loops back to block 702 to look for that circumstance to occur. If the gateway 114 does see a common unicast pointer in the message(s) destined for the same geographic region 108, the gateway 114 retrieves the additional content using the unicast pointer (block 706). For example, the gateway 114 may fetch a web page from a content server 126 that is pointed to be a URL embedded in the message(s).

The gateway 114 then generates a multicast/broadcast pointer to the additional content (block 708). The multicast/broadcast pointer may include none, some, or the entire unicast pointer. For example, the gateway 114 may add one or more characters to the URL embedded in the message(s)

(e.g., www.domain.com/content.htm becomes www.multicast.com/www.domain.com/content.htm), or the gateway 114 may create an entirely new pointer (e.g., www.domain.com/content.htm becomes www.multicast.com/123456). In another example, the gateway 114 may add one or more control characters to the URL embedded in the message(s). As an example of how the order of some steps may be changed, the gateway 114 may retrieve the additional content (block 706) before, after, and/or in parallel with generating the multicast pointer (block 708).

Once the gateway 114 has generated the multicast/broadcast pointer, the gateway 114 wirelessly transmits any suitable combination of (a) at least a portion of the message, (b) the multicast/broadcast pointer, (c) the unicast pointer, and/or (d) a time period via the unicast channel and/or the CMAS channel (block 710). For example, the gateway 114 may transmit "Evacuate your area using this map: www.multicast.com/www.fema.gov/map1" where "Evacuate your area using this map:" is a portion of the original message", "www.multicast.com/www.fema.gov/map1" is the multicast pointer, and "www.fema.gov/map1" is the unicast pointer.

As described in more detail below, the original unicast pointer may be used by the wireless device 116 as a backup to the multicast/broadcast pointer (e.g., for when the additional content is no longer in high demand and therefore not being transmitted on the multicast/broadcast channel 120). In such a circumstance, the gateway 114 may also include a time period used to suppress use of the unicast pointer during a time when allowing unicast access to the additional content is likely to cause congestion on the wireless network due to high demand and/or when the additional content is available on the multicast/broadcast channel 120.

After (or before) the gateway 114 transmits the multicast/broadcast pointer, the gateway 114 causes the additional content (e.g., an evacuation map or a viral video) to be transmitted on the multicast/broadcast channel 120 (block 712) in a way that the additional content may be retrieved by one or more wireless devices 106 using the multicast/broadcast pointer. For example, the multicast/broadcast channel 120 may be part of a multimedia broadcast multicast service (MBMS) managed by the wireless operator who owns the network elements in 114. In some circumstances, the gateway 114 causes the additional content to be transmitted once, and wireless devices 106 may capture and buffer the content for later use. In other circumstances, the gateway 114 may cause the additional content to be repeated (block 714). In this case, some wireless devices 106 may still capture and buffer the content for later use, and/or some wireless devices 106 may wait and retrieve the additional content in a just-in-time manner. When the time period expires, and/or when demand for the additional content falls below a threshold (e.g., less than some desired number of messages are being transmitted with the same URL), the gateway 114 may terminate the transmission of the content on the multicast/broadcast channel 120. In some circumstances, the gateway 114 provides a plurality of different content for simultaneous transmission on a plurality of different wireless multicast/broadcast channels (e.g., more than one web page on more than one multicast/broadcast channel).

Figure 8:
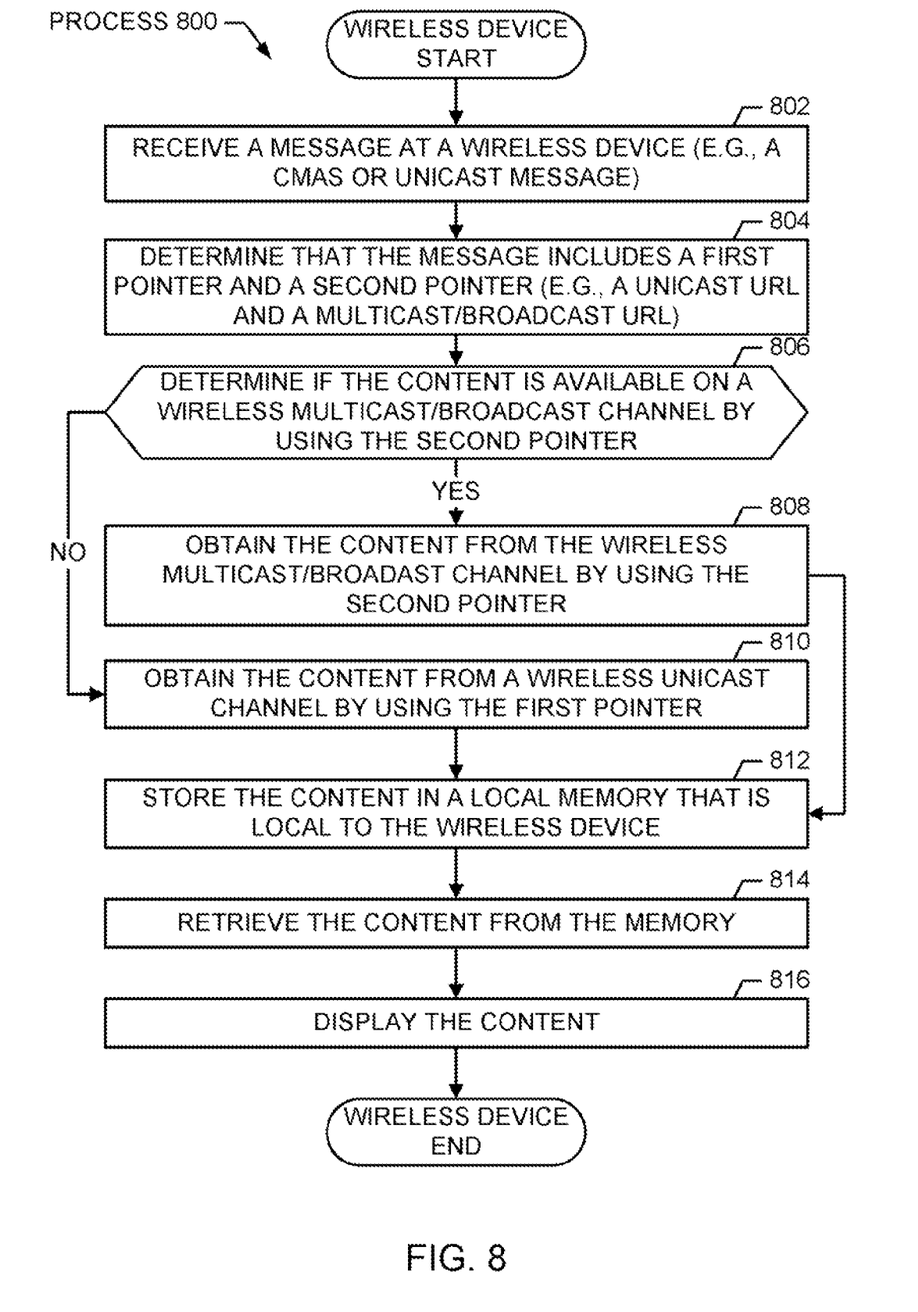
FIG. 8 is a flowchart of an example process for receiving content at a wireless device from a gateway.

A flowchart of an example process 800 for receiving content at a wireless device 106 from a gateway 114, or any other suitable device or system, is illustrated in FIG. 8. The process 800 may be embodied in one or more local and/or distributed software programs, which are stored in one or more memories and executed by one or more processors. Although the process 800 is described with reference to the flowchart illustrated in FIG. 8, it will be appreciated that many other methods of performing the acts associated with process 800 may be used. For example, the order of many of the steps may be changed, and some of the steps described may be optional. The process 800 may also be embodied in hardware or a combination of hardware and software. Suitable hardware may include one or more application specific integrated circuits (ASICs), state machines, field programmable gate arrays (FPGAs), digital signal processors (DSPs), and/or other hardware.

In general, a wireless device 106 receives a message (e.g., a text message) and two pointers to the same additional content associated with that message (e.g., a unicast URL and a multicast/broadcast URL). The wireless device 106 then attempts to retrieve the content using the multicast/broadcast URL. However, if that attempt is unsuccessful, the wireless device 106 may attempt to retrieve the content using the unicast channel. The content may then be stored in a local memory and later retrieved for display on the wireless device 106.

The process begins when a wireless device 106, and/or any other suitable device, receives a message from a wireless transmitter (block 802). For example, the message may be a CMAS message or a unicast message. The wireless device 106 then determines if the message includes a first pointer and a second pointer (block 804). For example, the first pointer may be a unicast URL and the second pointer may be a multicast/broadcast URL. The wireless device 106 then determines if the content is available on a wireless multicast/broadcast channel by using the second pointer (block 806). For example, the wireless device 106 may attempt to retrieve the content from a multimedia broadcast multicast service (MBMS).

If the content is available on the multicast/broadcast channel, the wireless device 106 obtains the content from the wireless multicast/broadcast channel by using the second pointer (block 808). For example, multicast/broadcast content receiver 308 may obtain the content from a multimedia broadcast multicast service (MBMS). If the content is not available on the multicast/broadcast channel, the wireless device 106 may obtain the content from a wireless unicast channel by using the first pointer (block 810). For example, the unicast content receiver 310 may obtain the content using a wireless point-to-point connection.

Once the wireless device 106 obtains the content (e.g., from the multicast/broadcast channel or the unicast channel), the wireless device 106 stores the content in a memory that is local to the wireless device 106 (block 812). Subsequently, the wireless device 106 may retrieve the content from memory (block 814), and display the content (block 816). For example, a user may request the content by clicking on a hyperlink.

In some instances, the additional content may be stored in memory a threshold period of time prior to a user request for the content (e.g., three hours before the user clicks on an associated hyperlink). Accordingly, the wireless device 106 may recheck if the content is available on the wireless multicast/broadcast channel by using the second pointer again. If the content is available on the wireless multicast/broadcast channel, the wireless device 106 may check a timestamp associated with the content and/or obtain the content from the wireless multicast/broadcast channel again in order to ensure the most recent version of the content. If the content is not available on the wireless multicast/broadcast channel, the wireless device 106 may retrieve the content from memory and/or issue an alert to the user about the age of the content. Alternatively, the wireless device 106 may check if the content is stored locally first, and simply use that version of the content without rechecking if the content is available on the wireless multicast/broadcast channel.

Figure 9:
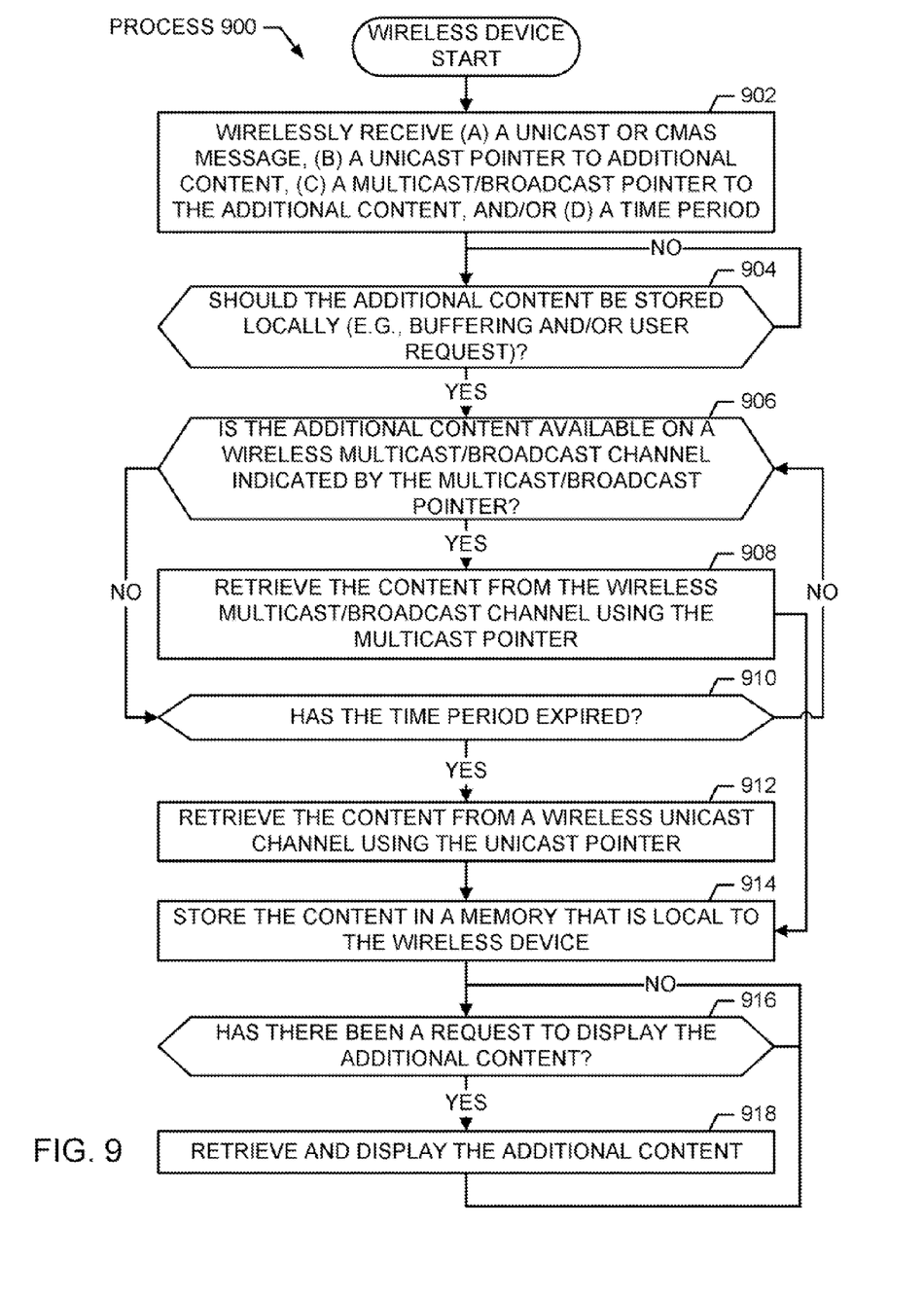
FIG. 9 is a flowchart of another example process for receiving content at a wireless device from a gateway.

A flowchart of another example process 900 for receiving content at a wireless device 106 from a gateway 114, or any other suitable device or system, is illustrated in FIG. 9. The process 900 may be embodied in one or more local and/or distributed software programs, which are stored in one or more memories and executed by one or more processors. Although the process 900 is described with reference to the flowchart illustrated in FIG. 9, it will be appreciated that many other methods of performing the acts associated with process 900 may be used. For example, the order of many of the steps may be changed, and some of the steps described may be optional. The process 900 may also be embodied in hardware or a combination of software and hardware. Suitable hardware may include one or more application specific integrated circuits (ASICs), state machines, field programmable gate arrays (FPGAs), digital signal processors (DSPs), and/or other hardware.

In general, a wireless device 106 receives a message (e.g., a text message) and two pointers to the same additional content associated with that message (e.g., a unicast URL and a multicast/broadcast URL). If the wireless device 106 needs the additional content, the wireless device 106 attempts to retrieve the content using the multicast/broadcast URL. However, if that attempt is unsuccessful, and a timer is not preventing the wireless device 106 from doing so, the wireless device 106 may attempt to retrieve the content using the unicast channel. The content may then be stored in a local memory and later retrieved for display on the wireless device 106.

The process 900 begins when a wireless device 106 receives (a) a unicast message or a CMAS message, (b) a unicast pointer to additional content, (c) a multicast/broadcast pointer to the additional content, and/or (d) a time period (block 902). For example, the wireless device 106 may receive "Check out this video: www.multicast.com/www.viralvideo.com/vid1".

The wireless device 106 then determines if the additional content should be stored locally (block 904). For example, the wireless device 106 may be configured to buffer some or all content received on one or more multicast channels 120, regardless of whether the user clicked on the associated hyperlink. In another example, the wireless device 106 may have received a user request for the additional content (e.g., a user clicked on an associated hyperlink). If the wireless device 106 is not going to store the additional content at that time, the wireless device 106 waits by looping back to check if the additional content should be stored later.

If the wireless device 106 is going to store the additional content, the wireless device 106 determines if the additional content is available on the wireless multicast channel 120 as indicated by the multicast pointer (block 906). If the additional content is available on the wireless multicast/broadcast channel 120, the wireless device 106 retrieves the content from the wireless multicast/broadcast channel 120 using the multicast/broadcast pointer (block 908).

If the additional content is not available on the wireless multicast/broadcast channel 120, the wireless device 106 checks if a time period (if any) has expired (block 910). The purpose of the time period is to suppress use of the unicast pointer during a time when allowing unicast access to the additional content is likely to cause congestion on the wireless network due to high demand and/or when the additional content is available on the multicast/broadcast channel 120. Once the time period expires, the wireless device 106 is allowed to retrieve the content from a wireless unicast channel 116 using the unicast pointer (block 912). The wireless device 106 may also continue to check if the additional content becomes available (e.g., is repeated) on the wireless multicast/broadcast channel 120 (block 906).

Regardless of the channel (multicast/broadcast 120 or unicast 116) used by the wireless device 106 to retrieve the additional content, the wireless device 106 stores the content in a memory that is local to the wireless device (block 914). If there is a request to display the additional content (block 916), before and/or after storing the additional content locally, the additional content is retrieved from local memory and displayed on the wireless device 106 (block 918). For example, a user of the wireless device 106 may click on a hyperlink to display the additional content. The user may elect to refresh the displayed content, in which case it will be retrieved from either the multicast/broadcast pointer, if still valid, or the unicast pointer.

In summary, persons of ordinary skill in the art will readily appreciate that methods and apparatus for serving content to a wireless device have been provided. Among other advantages, if a large number of wireless devices in the same geographic area all request the same additional content at approximately the same time, the network is less likely to become congested and slow down or fail, because the additional content is being transmitted on the multicast/broadcast channel instead of a plurality of unicast channels. For example, if an emergency message (e.g., CMAS) is sent to a large number of wireless devices in a certain geographic region, and that message includes a hyperlink to additional content (e.g., an evacuation map), the additional content is transmitted on a multicast/broadcast channel instead of a plurality of unicast channels, thereby conserving bandwidth. Similarly, if a large number of wireless devices in a certain geographic region all receive different unicast messages, but with a common pointer to additional content (e.g., the same URL to a "viral" video), the additional content is transmitted on a multicast/broadcast channel instead of a plurality of unicast channels, thereby conserving bandwidth.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of serving content to a wireless device, the method comprising:
   determining that at least one message containing a first pointer to the content is to be transmitted via an emergency alert system;
   in response thereto, obtaining the content using the first pointer and generating a second different pointer to the content;
   providing at least a portion of the at least one message and the second pointer for transmission via the emergency alert system;
   providing the content for transmission via a wireless multicast/broadcast channel based on the second pointer, wherein providing the content for transmission via the wireless multicast/broadcast channel includes repeatedly providing the content for transmission via the wireless multicast/broadcast channel, and
   terminating the repeatedly providing of the content for transmission via the wireless multicast/broadcast channel in response to a need for the content falling below a desired threshold.

2. The method of claim 1, wherein determining that the at least one message containing the first pointer to the content is to be transmitted via the emergency alert system comprises determining that the at least one message includes a uniform resource locator (URL).

3. The method of claim 1, wherein providing at least a portion of the at least one message includes providing the first pointer.

4. The method of claim 3, further comprising providing data indicative of a time period during which use of the first pointer is to be suppressed.

5. The method of claim 1, wherein a plurality of different content is provided for simultaneous transmission on a plurality of different wireless multicast/broadcast channels.

6. The method of claim 1, further comprising:
receiving the portion of the at least one message at a wireless device;
determining that the portion of the at least one message includes the first pointer and the second pointer;
determining if the content is available on the wireless multicast/broadcast channel using the second pointer;
if the content is available on the wireless multicast/broadcast channel, retrieving the content from the wireless multicast/broadcast channel using the second pointer;
if the content is not available on the wireless multicast/broadcast channel, retrieving the content from a wireless unicast channel using the first pointer; and
storing the content in a memory that is local to the wireless device.

7. The method of claim 6, further comprising:
receiving a user request associated with the content;
retrieving the content from the memory; and
displaying the content.

8. A method of serving content to a wireless device, the method comprising:
determining that at least one message containing a first pointer to the content is to be transmitted via an emergency alert system;
in response thereto, obtaining the content using the first pointer and generating a second different pointer to the content;
providing at least a portion of the at least one message and the second pointer for transmission via the emergency alert system;
providing the content for transmission via a wireless multicast/broadcast channel based on the second pointer;
receiving the portion of the at least one message at a wireless device;
determining that the portion of the at least one message includes the first pointer and the second pointer;
determining if the content is available on the wireless multicast/broadcast channel using the second pointer;
if the content is available on the wireless multicast/broadcast channel, retrieving the content from the wireless multicast/broadcast channel using the second pointer;
if the content is not available on the wireless multicast/broadcast channel, retrieving the content from a wireless unicast channel using the first pointer;
storing the content in a memory that is local to the wireless device; and
waiting for a timer associated with the wireless multicast/broadcast channel to expire before obtaining the content from the wireless unicast channel.

9. A method of serving content to a wireless device, the method comprising:
determining that at least one message containing a first pointer to the content is to be transmitted via a unicast channel to more than a threshold plurality of wireless devices associated with a desired geographic region;
in response thereto, obtaining the content using the first pointer and generating a second different pointer to the content;
providing at least a portion of the at least one message and the second pointer for transmission via the unicast channel; and
providing the content for transmission via a wireless multicast/broadcast channel based on the second pointer.

10. The method of claim 9, wherein determining that the at least one message is to be transmitted to more than the threshold plurality of wireless devices includes counting unicast packets that (a) contain the first pointer and (b) are destined for the desired geographic region.

11. The method of claim 9, wherein determining that the at least one message is to be transmitted to more than the threshold plurality of wireless devices includes determining that a plurality of messages are being transmitted within a desired time window.

12. The method of claim 9, wherein providing at least a portion of the at least one message includes providing the first pointer.

13. The method of claim 12, further comprising providing data indicative of a time period during which use of the first pointer is to be suppressed.

14. The method of claim 9, wherein providing the content for transmission via the wireless multicast/broadcast channel includes repeatedly providing the content for transmission via the wireless multicast/broadcast channel.

15. The method of claim 14, further comprising terminating the repeatedly providing of the content for transmission via the wireless multicast/broadcast channel in response to a need for the content falling below a desired threshold.

16. The method of claim 9, wherein a plurality of different content is provided for simultaneous transmission on a plurality of different wireless multicast/broadcast channels.

17. The method of claim 9, further comprising:
receiving the portion of the at least one message at a wireless device;
determining that the portion of the at least one message includes the first pointer and the second pointer;
determining if the content is available on the wireless multicast/broadcast channel using the second pointer;
if the content is available on the wireless multicast/broadcast channel, retrieving the content from the wireless multicast/broadcast channel using the second pointer;
if the content is not available on the wireless multicast/broadcast channel, retrieving the content from a wireless unicast channel using the first pointer; and
storing the content in a memory that is local to the wireless device.

18. The method of claim 17, further comprising:
receiving a user request associated with the content;
retrieving the content from the memory; and
displaying the content.

19. The method of claim 17, further comprising waiting for a timer associated with the wireless multicast/broadcast channel to expire before obtaining the content from the wireless unicast channel.

20. A method of retrieving content at a wireless device, the method comprising:
receiving a message at a wireless device;
determining that the message includes a first pointer and a second pointer;
determining if the content is available on a wireless multicast/broadcast channel using the second pointer;

if the content is available on the wireless multicast/broadcast channel, obtaining the content from the wireless multicast/broadcast channel using the second pointer;

if the content is not available on the wireless multicast/broadcast channel, obtaining the content from a wireless unicast channel using the first pointer;

receiving a user request to view the content after obtaining the content;

storing the content in a memory that is local to the wireless device;

retrieving the content from the memory; and displaying the content.

21. The method of claim 20, wherein receiving the message includes receiving an emergency alert system message.

22. The method of claim 20, including receiving a time period during which use of the first pointer is to be suppressed.

23. The method of claim 20, wherein retrieving the content from the wireless multicast/broadcast channel includes waiting for the content on the wireless multicast/broadcast channel to repeat.

24. The method of claim 20, wherein the first pointer is a first uniform resource locator (URL) and the second pointer is a second different uniform resource locator (URL).

25. An apparatus for serving content to a wireless device, the apparatus comprising:
 at least one network interface; and
 a first controller operatively coupled to the at least one network interface, the first controller being structured to cause the apparatus to:
  determine that at least one message containing a first pointer to the content is to be transmitted via an emergency alert system;
  in response thereto, obtain the content via the at least one network interface using the first pointer and generate a second different pointer to the content;
  provide at least a portion of the at least one message and the second pointer via the at least one network interface for transmission via the emergency alert system;
  provide the content via the at least one network interface for transmission via a wireless multicast/broadcast channel based on the second pointer, wherein the first controller is structured to repeatedly provide the content for transmission via the wireless multicast/broadcast channel; and
  terminate repeatedly providing the content for transmission via the wireless multicast/broadcast channel in response to a need for the content falling below a desired threshold.

26. The apparatus of claim 25, wherein the first controller is structured to determine that the at least one message includes a uniform resource locator (URL).

27. The apparatus of claim 25, wherein the first controller is structured to provide the first pointer via the emergency alert system.

28. The apparatus of claim 27, wherein the first controller is structured to provide data indicative of a time period during which use of the first pointer is to be suppressed.

29. The apparatus of claim 25, wherein the first controller is structured to provide a plurality of different content for simultaneous transmission on a plurality of different wireless multicast/broadcast channels.

30. The apparatus of claim 25, further comprising:
 a receiver structured to receive a message at the wireless device;
 a memory;
 a display; and
 a second controller operatively coupled to the receiver, the memory, and the display, the second controller being structured to:
  determine that the message includes a first pointer and a second pointer;
  determine if the content is available on a wireless multicast/broadcast channel using the second pointer;
  obtain the content from the wireless multicast/broadcast channel using the second pointer;
  obtain the content from the wireless unicast channel using the first store the content in the memory; and
  display the content on the display.

31. The apparatus of claim 30, wherein the second controller is structured to wait for a timer associated with the wireless multicast/broadcast channel to expire before obtaining the content from the wireless unicast channel.

32. An apparatus for serving content to a wireless device, the apparatus comprising:
 at least one network interface; and
 a first controller operatively coupled to the at least one network interface, the first controller being structured to cause the apparatus to:
  determine that at least one message containing a first pointer to the content is to be transmitted via a unicast channel to more than a threshold plurality of wireless devices associated with a desired geographic region;
  in response thereto, obtain the content using the first pointer and generate a second different pointer to the content;
  provide at least a portion of the at least one message and the second pointer for transmission via the unicast channel; and
  provide the content for transmission via a wireless multicast/broadcast channel based on the second pointer.

33. The apparatus of claim 32, wherein the first controller is structured to count unicast packets that (a) contain the first pointer and (b) are destined for the desired geographic region.

34. The apparatus of claim 32, wherein the first controller is structured to determine that a plurality of messages is being transmitted within a desired time window to more than the threshold plurality of wireless devices.

35. The apparatus of claim 32, wherein the first controller is structured to provide the first pointer for transmission via the unicast channel.

36. The apparatus of claim 35, wherein the first controller is structured to provide data indicative of a time period during which use of the first pointer is to be suppressed.

37. The apparatus of claim 32, wherein the first controller is structured to repeatedly provide the content for transmission via the wireless multicast/broadcast channel.

38. The apparatus of claim 32, wherein the first controller is structured to provide a plurality of different content for simultaneous transmission on a plurality of different wireless multicast/broadcast channels.

39. The apparatus of claim 32, further comprising:
 a receiver structured to receive a message at the wireless device;
 a memory;
 a display; and
 a second controller operatively coupled to the receiver, the memory, and the display, the second controller being structured to:
  determine that the message includes a first pointer and a second pointer;
  determine if the content is available on a wireless multicast/broadcast channel using the second pointer;

obtain the content from the wireless multicast/broadcast channel using the second pointer;

obtain the content from the wireless unicast channel using the first pointer;

store the content in the memory; and display the content on the display.

40. The apparatus of claim 39, wherein the second controller is structured to wait for a timer associated with the wireless multicast/broadcast channel to expire before obtaining the content from the wireless unicast channel.

41. An apparatus for retrieving content at a wireless device, the apparatus comprising:

a receiver;

a memory;

a display; and a controller operatively coupled to the receiver, the memory, and the display, the controller being structured to:

receive a message at the wireless device via the receiver;

determine that the message includes a first pointer and a second pointer;

determine if the content is available on a wireless multicast/broadcast channel using the second pointer;

obtain the content from the wireless multicast/broadcast channel using the second pointer;

receive a user request to view the content after obtaining the content from the wireless multicast/broadcast channel using the second pointer;

obtain the content from the wireless unicast channel using the first pointer;

store the content in the memory; and display the content on the display.

42. The apparatus of claim 41, wherein the controller is structured to receive an emergency alert system message.

43. The apparatus of claim 39, wherein the controller is structured to receive a time period during which use of the first pointer is to be suppressed.

44. The apparatus of claim 41, wherein the controller is structured to wait for the content on the wireless multicast/broadcast channel to repeat.

45. The apparatus of claim 41, wherein the first pointer is a first uniform resource locator (URL) and the second pointer is a second different uniform resource locator (URL).

46. A method of serving content to a wireless device, the method comprising:

determining that at least one message containing a uniform resource locator (URL) to the content is to be transmitted via an emergency alert system;

in response thereto, obtaining the content using the first pointer and generating a second different pointer to the content;

providing at least a portion of the at least one message, the first pointer, and the second pointer for transmission via the emergency alert system;

repeatedly providing the content for transmission via a wireless multicast/broadcast channel based on the second pointer until a need for the content falls below a desired threshold; and providing data indicative of a time period during which use of the first pointer is to be suppressed.

47. An apparatus for serving content to a wireless device, the apparatus comprising:

at least one network interface; and a first controller operatively coupled to the at least one network interface, the first controller being structured to cause the apparatus to:

determine that at least one message containing a uniform resource locator (URL) to the content is to be transmitted via an emergency alert system;

in response thereto, obtain the content using the first pointer and generating a second different pointer to the content;

provide at least a portion of the at least one message, the first pointer, and the second pointer for transmission via the emergency alert system;

repeatedly provide the content for transmission via a wireless multicast/broadcast channel based on the second pointer until a need for the content falls below a desired threshold; and provide data indicative of a time period during which use of the first pointer is to be suppressed.

48. The method of claim 1, wherein said terminating the repeatedly providing of the content for transmission via the wireless multicast/broadcast channel in response to the need for the content falling below the desired threshold comprises terminating the repeatedly providing of the content for transmission via the wireless multicast/broadcast channel when a number of wireless devices, to receive the at least one message to be transmitted, falls below a threshold number of devices.

49. The method of claim 1, wherein said terminating the repeatedly providing of the content for transmission via the wireless multicast/broadcast channel in response to the need for the content falling below the desired threshold comprises terminating the repeatedly providing of the content for transmission via the wireless multicast/broadcast channel when a number of wireless devices, within a geographic region to receive the at least one message to be transmitted, falls below a threshold number of devices.

* * * * *